(12) United States Patent
Kuo et al.

(10) Patent No.: US 8,832,249 B2
(45) Date of Patent: Sep. 9, 2014

(54) METHODS AND APPARATUS TO ADJUST RESOURCE ALLOCATION IN A DISTRIBUTIVE COMPUTING NETWORK

(75) Inventors: Richard Kuo, Mountain View, CA (US); James Fan, San Ramon, CA (US); Deva-Datta Sharma, San Ramon, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 57 days.

(21) Appl. No.: 13/308,131

(22) Filed: Nov. 30, 2011

(65) Prior Publication Data

US 2013/0138816 A1    May 30, 2013

(51) Int. Cl.
*G06F 15/173* (2006.01)

(52) U.S. Cl.
USPC ........................................... 709/223; 709/226

(58) Field of Classification Search
None
See application file for complete search history.

(56) References Cited

U.S. PATENT DOCUMENTS

| | | | |
|---|---|---|---|
| 7,054,933 B2 * | 5/2006 | Baxley et al. ................. | 709/226 |
| 7,222,345 B2 * | 5/2007 | Gray et al. ..................... | 718/104 |
| 7,330,832 B1 * | 2/2008 | Gray et al. ........................ | 705/37 |
| 7,721,292 B2 * | 5/2010 | Frasier et al. ................. | 718/104 |
| 8,239,534 B1 * | 8/2012 | Fall et al. ....................... | 709/226 |
| 8,504,689 B2 * | 8/2013 | Ferris et al. .................... | 709/226 |
| 2005/0177058 A1 * | 8/2005 | Sobell ............................ | 600/545 |
| 2006/0224436 A1 * | 10/2006 | Matsumoto et al. ............ | 705/10 |
| 2007/0118839 A1 * | 5/2007 | Berstis et al. ................. | 718/105 |
| 2007/0283016 A1 * | 12/2007 | Pendarakis et al. ........... | 709/226 |
| 2008/0244073 A1 * | 10/2008 | Czap et al. ..................... | 709/226 |
| 2009/0043893 A1 * | 2/2009 | Pendarakis et al. ........... | 709/226 |
| 2009/0276771 A1 | 11/2009 | Nickolov et al. | |
| 2009/0300183 A1 * | 12/2009 | Feng et al. ..................... | 709/226 |
| 2010/0050172 A1 * | 2/2010 | Ferris ................................ | 718/1 |
| 2010/0115099 A1 * | 5/2010 | Gu et al. ........................ | 709/226 |
| 2010/0153482 A1 | 6/2010 | Kim et al. | |
| 2010/0223378 A1 | 9/2010 | Wei | |
| 2010/0248698 A1 | 9/2010 | In et al. | |
| 2010/0250497 A1 | 9/2010 | Redlich et al. | |
| 2010/0325283 A1 * | 12/2010 | Luzzatti et al. ............... | 709/226 |
| 2010/0332373 A1 * | 12/2010 | Crabtree et al. ................ | 705/37 |
| 2010/0332401 A1 | 12/2010 | Prahlad et al. | |
| 2010/0332454 A1 | 12/2010 | Prahlad et al. | |
| 2010/0332456 A1 | 12/2010 | Prahlad et al. | |
| 2010/0333116 A1 | 12/2010 | Prahlad et al. | |
| 2011/0126197 A1 | 5/2011 | Larsen et al. | |
| 2011/0138050 A1 | 6/2011 | Dawson et al. | |
| 2011/0179141 A1 | 7/2011 | Ravichandran et al. | |
| 2011/0238737 A1 | 9/2011 | Agrawal et al. | |
| 2011/0295999 A1 * | 12/2011 | Ferris et al. .................... | 709/224 |
| 2012/0072578 A1 * | 3/2012 | Alam ............................. | 709/224 |
| 2012/0084355 A1 * | 4/2012 | Locker et al. ................. | 709/204 |
| 2012/0131161 A1 * | 5/2012 | Ferris et al. .................... | 709/223 |
| 2012/0131174 A1 * | 5/2012 | Ferris et al. .................... | 709/224 |
| 2012/0131193 A1 * | 5/2012 | Ferris et al. .................... | 709/226 |

(Continued)

*Primary Examiner* — Ninos Donabed
(74) *Attorney, Agent, or Firm* — Hartman & Citrin LLC

(57) ABSTRACT

Methods and apparatus are disclosed to adjust resource allocation in a distributive computing network. An example method includes receiving data representing performance of a first resource allocation provided by the distributive computing network. The example method includes receiving a resource request specifying a second resource allocation to be provided by the distributive computing network. The example method includes simulating the distributive computing network using the data to determine an operating configuration for adjusting the first resource allocation to satisfy the resource request with a third resource allocation, different than the second resource allocation. The example method includes adjusting the first resource allocation based on the operating configuration.

14 Claims, 6 Drawing Sheets

(56) References Cited

U.S. PATENT DOCUMENTS

2012/0137001 A1* 5/2012 Ferris et al. .................. 709/226
2012/0137003 A1* 5/2012 Ferris et al. .................. 709/226
2012/0284408 A1* 11/2012 Dutta et al. .................. 709/226
2012/0324114 A1* 12/2012 Dutta et al. .................. 709/226
2013/0097313 A1* 4/2013 Zhang et al. .................. 709/224

* cited by examiner

US 8,832,249 B2

METHODS AND APPARATUS TO ADJUST RESOURCE ALLOCATION IN A DISTRIBUTIVE COMPUTING NETWORK

FIELD OF THE DISCLOSURE

This disclosure relates generally to distributive computing networks, and, more particularly, to methods and apparatus to adjust resource allocation in a distributive computing network.

BACKGROUND

Cloud computing platforms are becoming popular with customers by providing flexible, on demand resources at a relatively low cost. A cloud computing network, also known as a distributive or distributed computing network, enables clients to manage web-based applications (e.g., services) and/or data resources by dynamically leasing resources from service providers. This dynamic leasing of resources creates the appearance and function of a distributive computing network and, thus, can be referred to as virtualization of a computer network. Since cloud computing platforms utilize virtualization of network and/or computing resources, new resources for a client may be allocated to the client as needed within short periods of time by a service provider. Additionally, cloud computing virtualization enables service providers to dynamically multiplex resources among multiple clients without dedicating individual physical resources to each client.

DETAILED DESCRIPTION

Figure 1:
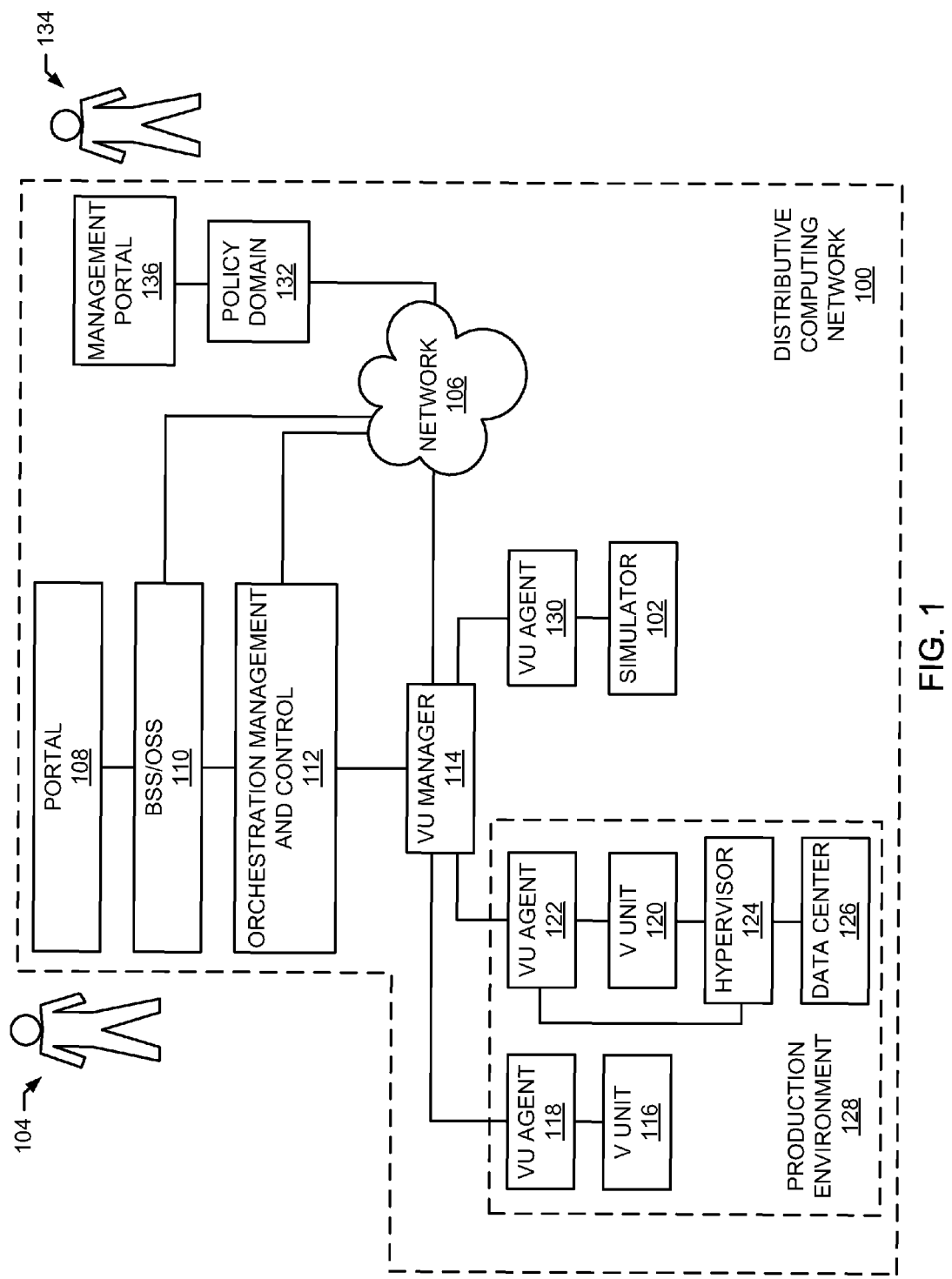
FIG. 1 is a schematic illustration of an example distributive computing network.

Example methods, systems, apparatus and/or computer-readable storage media disclosed herein adjust resource allocation in a distributive computing network. A disclosed example method includes receiving data representing performance of a first resource allocation provided by the distributive computing network. The example method also includes receiving a resource request specifying a second resource allocation to be provided by the distributive computing network. The example method further includes simulating the distributive computing network using the data to determine an operating configuration for adjusting the first resource allocation to satisfy the resource request with a third resource allocation, different than the second resource allocation. In some examples, the example method further includes adjusting the first resource allocation based on the operating configuration.

A disclosed example system includes a data receiver to receive data representing performance of a first resource allocation provided by a distributive computing network. The example system also includes a resource request receiver to receive a resource request specifying a second resource allocation to be provided by the distributive computing network. The example system further includes a cloud resource simulator to simulate the distributive computing network using the data to determine an operating configuration for adjusting the first resource allocation to satisfy the resource request with a third resource allocation, different than the second resource allocation. In some examples, the example system includes a cloud resource adjuster to adjust the first resource allocation based on the operating configuration.

A disclosed example tangible computer-readable medium includes instructions that, when executed, cause a computing device to receive data representing performance of a first resource allocation provided by a distributive computing network. The example instructions also cause the computing device to receive a resource request specifying a second resource allocation to be provided by the distributive computing network. The example instructions further cause the computing device to simulate the distributive computing network using the data to determine an operating configuration for adjusting the first resource allocation to satisfy the resource request with a third resource allocation, different than the second resource allocation. In some examples, the example instructions cause the computing device to adjust the first resource allocation based on the operating configuration.

Distributive or distributed computing networks (e.g., cloud computing networks) enable subscribing clients (e.g., customers and/or service deployers) to flexibly lease servers and/or other computing resources based on actual usage. Distributive computing networks are typically used by clients to host services that may be implemented as software-as-a-service (SaaS). SaaS systems may include web-based front-end applications (e.g., online retail businesses) and/or data processing applications (e.g., online document processing applications). Further, distributive computing networks may be implemented as infrastructure-as-a-service (IaaS) data storage applications and/or platform-as-a-service (PaaS) customized applications. For example, web-based applications may be designed for customers to purchase goods or services (e.g., an online retail site), enroll in a service (e.g., an online news reporting site), etc. The clients that may deploy web-based services, data processing services, and/or customized services may range from enterprise level businesses to entrepreneurial individuals. In some examples, a client may subscribe to a distributive computing network that is operated by a service provider. In such examples, the cloud service provider manages the allocation of resources within the distributive computing network for each hosted service.

The cloud service providers (e.g., cloud computing managers) may allocate resources based on, for example, consumer, customer, and/or client usage to maximize an operating efficiency (e.g., scalability) of multiple services hosted by resources. These resources may be grouped as virtual units (e.g., virtual machines, virtual network resources, etc.) that utilize the computing, storage, and/or network resources of one or more servers (e.g., processors, data storage databases, etc.) and/or networks (e.g., local area networks, wide area networks, etc.) to host a service. The service providers may assign respective Internet Protocol (IP) addresses to each virtual unit and/or to each distributive computing network resource. The IP addresses may then be used by the service provider to route network traffic to the virtual units hosting the requested service.

FIG. 1 is a schematic illustration of an example distributive computing network 100 including an example simulator 102 to adjust resource allocation in the example distributive computing network 100. In some examples, adjusting resource allocation enables the distributive computing network 100 of the illustrated example to operate at an increased level of efficiency. For example, use of various resources of the distributive computing network 100 may reach peak levels at different times. Adjusting the resource allocation allows some idled resources to be shifted to users (e.g., an example user 104) who may request and/or require additional computing resources. Further, resource allocation and/or redistribution may be implemented not only at an individual user level, but across multiple cloud computing providers. For example, if the distributive computing network 100 of the illustrated example requires additional resources during a peak usage time, the distributive computing network 100 may utilize resources of another cloud computing provider rather than creating new resources during this peak usage time.

In another example, the user 104 may request certain size(s) and/or type(s) of resources. In some examples, the simulator 102 may determine a more efficient way to provide the user with the requested service (e.g., using different size(s), type(s), and/or location(s) of resources). In such examples, the user is provided with the same level of service, but the distributive computing network 100 is able to optimize the manner with which it provides the service (e.g., in terms of lower cost, increased speed, reduced resource use, etc.).

The distributive computing network 100 of the illustrated example is implemented in connection with an example network 106 (e.g., the Internet). The network 106 of the illustrated example includes any type of network for routing packet-based communications (e.g., data). The network 106 may be implemented, for example, by any type of public switched telephone network (PSTN) system(s), public landmobile network (PLMN) system(s), wireless distribution system(s), wired or cable distribution system(s), coaxial cable distribution system(s), fiber-to-the-home network(s), fiber-to-the-curb network(s), fiber-to-the-pedestal network(s), fiber-to-the-vault network(s), fiber-to-the-neighborhood network(s), Ultra High Frequency (UHF)/Very High Frequency (VHF) radio frequency system(s), satellite or other extraterrestrial system(s), cellular distribution system(s), powerline broadcast system(s), and/or combinations and/or hybrids of these devices, systems and/or networks.

The distributive computing network 100 of the illustrated example is accessed by the user 104. The user 104 of the illustrated example includes a customer and/or a user of a service hosted by the example distributive computing network 100. The distributive computing network 100 of the illustrated example hosts one or more services for the user 104 using a resource allocation based on, for example, usage requirements, bandwidth requirements, processor efficiency, etc. The user 104 of the illustrated example accesses the service from any location via the example network 106. Further, the example user 104 may include any individual, organization, and/or enterprise that may access the network 106 via any type of network and/or gateway including a Virtual Private Network (VPN), a Local Area Network (LAN), a Virtual LAN (VLAN), a Multiprotocol Label Switching (MPLS) VPN, etc. The example distributive computing network 100 may be accessed by multiple users, but for ease of description, reference will be made to the user 104.

The distributive computing network 100 of the illustrated example includes an example portal 108 to interface with the user 104 and to facilitate communication between the user 104 and the distributive communication network 100. The portal 108 of the illustrated example allows a new and/or existing customer (e.g., the user 104) to request and/or modify cloud services and/or resource allocation provided by the distributive communication network 100. The user 104 may utilize the portal 108 of the illustrated example to create requests by providing resource allocation information. The resource allocation information may include information for creating a virtual unit to host a service, information for partitioning the virtual unit into one or more virtualized groups, information defining a framework, environment, and/or runtime technology for hosting a service, etc, and/or any combination thereof. In some examples, the resource allocation information may include, but is not limited to, a configuration type (e.g., a virtualized group or domain type), one or more configuration groups within a configuration type, a location for one or more portions of the physical resources grouped together by a virtual unit, a data storage requirement, a bandwidth requirement, a runtime engine requirement, an operating system requirement, an application type, a service type, a hosting environment requirement, a lifecycle environment, and/or a size requirement for a portion of the distributive computing network 100.

The distributive computing network 100 of the illustrated example may provide the user 104 with basic resource allocation options (e.g., to select among a small, medium, or large number of resources) or may allow the user 104 to build and/or design the resource allocation (e.g., from scratch). For example, the user 104 may select one resource allocation parameter and, based on that selection, the distributive computing network 100 may provide a second resource allocation parameter for the user 104 to select, and so on until a complete resource allocation had been determined.

Further, the portal 108 of the illustrated example facilitates creation and/or acceptance of a service level agreement ("SLA") between the user 104 and the example distributive computing network 100. The SLA specifies, for example, resource allocations, resource allocation strategies (e.g., at the lowest cost possible), resource conditions which require user intervention and/or input, and/or basic performance levels to be provided to the user 104 by the example distributive computing network 100.

The distributive computing network 100 of the illustrated example includes an example business support system/open source software ("BSS/OSS") layer 110 to implement support functions and/or services for the user 104 via the portal 108. Functions and/or services offered by the BSS/OSS 110 may relate to, for example, sales, service mediation, service assurance, trouble management, usage manager, billing mediation, capacity planning, billing, etc.

The distributive computing network 100 of the illustrated example includes an example orchestration management and control layer ("orchestrator") 112 to implement, update, lease, release, and/or remove resources in the distributive computing network 100. The orchestrator 112 of the illustrated example provides orchestration management functions to support static and/or dynamic executions to host services for the user 104. Orchestration management functions may include, for example, select, configure, create, preserve, delete, recover, restore, and/or notify.

The orchestrator 112 of the illustrated example provides orchestration control functions to control resources used to host services for the user 104. The orchestrator 112 may include, for example, one or more of an internal cross domain controller, an external cross domain controller, and an individual domain controller. The internal cross domain controller of the example orchestrator 112 may use the orchestration management functions to coordinate, monitor, correlate, and/or request resources among multiple individual domain controllers (e.g., other individual domain controllers within the example orchestrator 112). The external cross domain controller of the example orchestrator 112 may use the orchestration management functions to request, support, and/or coordinate resources from and/or to an external cloud resource provider (e.g., internal resources managed by another orchestrator within the example distributive computing network 100 or resources managed by another distributive computing network or cloud computing provider). The individual domain controller of the example orchestrator 112 may request, support, monitor, and/or correlate resources within a single domain. A domain may include, for example, a domain name system ("DNS"), a network domain, a storage domain, a computing domain, etc. Thus, the orchestrator 112 of the illustrated example may include a computing controller, a storage controller, a network controller, etc.

The distributive computing network 100 of the illustrated example includes an example virtual unit manager ("VU manager") 114 to facilitate the control, creation, allocation, and/or distribution of services hosted by the resources of the example distributive computing network 100. In a centralized example, the VU manager 114 receives instructions from the orchestrator 112 to create and/or allocate services and/or resources within the example distributive computing network 100. In a decentralized example, the VU manager 114 assumes these control functions. In the illustrated example, the VU manager 114 creates and/or allocates resources based on, for example, the resource request input by the user 104 and the SLA agreed to by the user 104.

In the illustrated example, the services and/or resources created and/or allocated by the VU manager 114 are organized into virtual units. A virtual unit may be created for each hosted service or a single virtual unit may host multiple servers. A virtual unit may include any number of servers, computing resources, processors, storage resources, networking resources, etc. Virtual units may be created to support, for example, computing, storage, and network domains. The VU manager 114 of the illustrated example creates and configures a virtual unit to provide a specific domain resource (e.g., computing, storage, or network resources) as instructed by the example orchestrator 112. The VU manager 114 may create, for example, a virtual machine to provide computing and/or storage resources and/or a VLAN to provide network resources. The VU manager 114 of the illustrated example creates and manages resources in any and/or all of the computing, storage, and network domains.

The VU manager 114 of the illustrated example also creates a virtual unit agent ("VU agent") corresponding to each virtual unit. A VU agent is created and utilized to monitor its corresponding virtual unit and to collect statistical data related to the performance of its corresponding virtual unit (e.g., in terms of central processing unit ("CPU") usage, memory usage, network traffic, etc.), which is also referred to herein as production data. As virtual units are operating (e.g., providing services and/or resources to the user 104), VU agents collect the production data of their corresponding virtual units and forward this production data to the VU manager 114.

The VU manager 114 of the illustrated example analyzes the production data to determine resource usage trends and/or predict resource needs. For example, if the VU manager 114 determines use of resources is low during a certain time, the VU manager 114 may inform the example orchestrator 112 to lease these resources to another cloud computing provider during these times. In another example, the orchestrator 112 may offer these resources to users (e.g., user 104) as part of a promotion (e.g., the resources may be free or offered at a discounted price during low usage times).

In the example of FIG. 1, the VU manager 114 creates an example virtual unit 116 to provide virtual resources (e.g., servers, memory, databases, caches, etc.) and an example VU agent 118 to monitor the virtual unit 116. The VU manager 114 of the illustrated example also creates an example virtual unit 120 to provide physical resources (e.g., servers, computing resources, processors, hardware resources, etc.) and an example VU agent 122 to monitor the virtual unit 120. The virtual unit 120 communicates with an example hypervisor 124. The hypervisor 124 is provided to facilitate the use of hardware resources contained in an example data center 126. The virtual unit 116, the VU agent 118, the virtual unit 120, the VU agent 122, the hypervisor 124, and the data center 126 are collectively referred to herein as resources 116-126 included in an example production environment 128. The production environment 128 is responsible for providing resources used by the distributive computing network 100 of the illustrated example to provide services to the user 104. The resources 116-126 in the production environment 128 may communicate using any type of LAN, VLAN, private LAN, and/or any other type of routing network included within the distributive computing network 100, such as the network 106.

While the production environment 128 is shown with resources 116-126, the production environment 128 and/or the distributive computing network 108 may include additional physical resources, virtual resources, services, and/or may allocate the resources differently. The resources 116-126 of the example production environment 128 may be located at a single physical location or, alternatively, the resources 116-126 of the example production environment 128 may be located across different physical locations. Further, the virtual unit 116 and the VU agent 118 may be implemented with a single database and/or memory or, alternatively, with a plurality of databases and/or memories. Likewise, the virtual unit 120, the VU agent, the hypervisor 124, and/or the data center 126 may be implemented on a single server and/or computing resource or, alternatively, on a plurality of servers and/or computing resources.

The VU manager 114 of the illustrated example facilitates routing of traffic between appropriate computing resources hosting a plurality of services (e.g., virtual units, virtual agents, etc.) within the example distributive computing network 100. The example VU manager 114 may facilitate such routing using routing tables, for example. Routing tables may be distributed to a plurality of routers within the example distributive computing network 100 and may be updated as resource allocations are modified.

The VU manager 114 of the illustrated example also facilitates the creation of the simulator 102 and its respective example VU agent 130 to adjust resource allocation in the example distributive computing network 100. The simulator 102 of the illustrated example uses production data representing current resource usage and demand to simulate the performance and/or cost of operating and altering the current resource allocation of the distributive computing network 100. In some examples, the simulator 102 executes simulations while the example production environment 128 is providing services and/or resources to the user 104. The simulator 102 of the illustrated example uses results of simulations to optimize the performance of and/or adjust resource allocation in the example distributive computing network 100.

The simulator 102 of the illustrated example receives production data (e.g., production data collected by the VU agents 118 and 122) from the VU manager 114. The simulator 102 may receive production data via, for example, an application programming interface ("API"). The production data reflects the current resource usage in the example production environment 128. The simulator 102 of the illustrated example also receives a resource request. The resource request indicates, defines and/or otherwise specifies a resource allocation (e.g., a resource allocation different than the resource allocation currently implemented) to be implemented by the example distributive computing network 100. The resource request may be input, for example, by the user 104 via the portal 108 to create a new service and/or to modify an existing service being performed by the distributive computing network 100. For example, a new user may enter a request and the simulator 102 may perform simulations to verify that the distributive computing network 100 can provide the requested services before implementing the services in the distributive computing network.

Upon receiving the resource request, the orchestrator 112 of the illustrated example instructs the VU manager 114 to initiate a simulation to determine a manner in which to implement the requested resource allocation. For example, a resource request might request the use of 100 virtual machines (or some other number of virtual machines). In such an example, the simulator 102 can be used to determine a manner in which to implement that request (e.g., a location of the virtual machines, a number of the virtual machines (e.g., which may be the same as or different from the 100 virtual machines specified in the request), a time to run the virtual machines, a size of the virtual machines, etc.).

In determining a manner in which to implement a resource allocation request, the simulator 102 of the illustrated example uses the production data collected from the example production environment 128, the resource request itself, and possibly policies and/or rules defined by and/or applied to the example distributive computing network 100. In some examples, policies and/or rules are used to govern the behavior of the distributive computing network 100. Policies and/or rules may include, for example, the SLA agreed to by the user 104, quality of service parameters defined in a product catalog, business rules, cost rules, scheduling rules, etc. For example, a policy might indicate how to react when a virtual machine runs out of capacity based on a subscription and preferences of the user 104 (e.g., by indicating that more virtual machines can be added without approval from the user 104). In another example, a policy might indicate how the orchestrator 112 should react when there is an overall shortage of resources in the distributive computing network 100 or there is an excess of those resources. Another policy might indicate under what conditions the virtual machines providing service to the user 104 should be moved to a different data center.

The distributive computing network 100 of the illustrated example includes an example policy domain 132 to gather and/or store such policies and/or rules. An example manager 134 (e.g., a manager of the distributive computing network 100, such as a person associated with the cloud service provider) implements policies and/or rules via an example management portal 136. Additionally, the management portal 136 of the illustrated example may be used to allow the manager 134 to monitor the distributive computing network 100 and/or to allow the manager 134 to input a resource allocation request to perform capacity planning. The policies and/or rules stored in the policy domain 132 of the illustrated example are passed to the VU manager 114 via the network 106 to be used by the simulator 102 during simulation.

Example manners in which the simulator 102 of the illustrated example executes simulations are described in greater detail below in connection with FIGS. 2-5. Upon completing a simulation using production data, a resource request, and policies and/or rules, the simulator 102 of the illustrated example determines an operating configuration defining a manner (e.g., a possible manner among a set of one or more possible manners, a recommended manner, etc.) in which to implement the resource allocation request. The simulator 102 of the illustrated example passes the operating configuration to the VU manager 114 via the VU agent 130. The VU manager 114 of the illustrated example may implement the operating configuration itself or may pass the operating configuration to the orchestrator 112 to approve implementation. In some examples, the operating configuration may be sent to the user 104 to approve implementation. In some examples, the operating configuration determined by the simulator 102 of the illustrated example is implemented and the resources of the production environment 128 are adjusted and/or allocated accordingly to optimize the distributive computing network 100.

Figure 2:
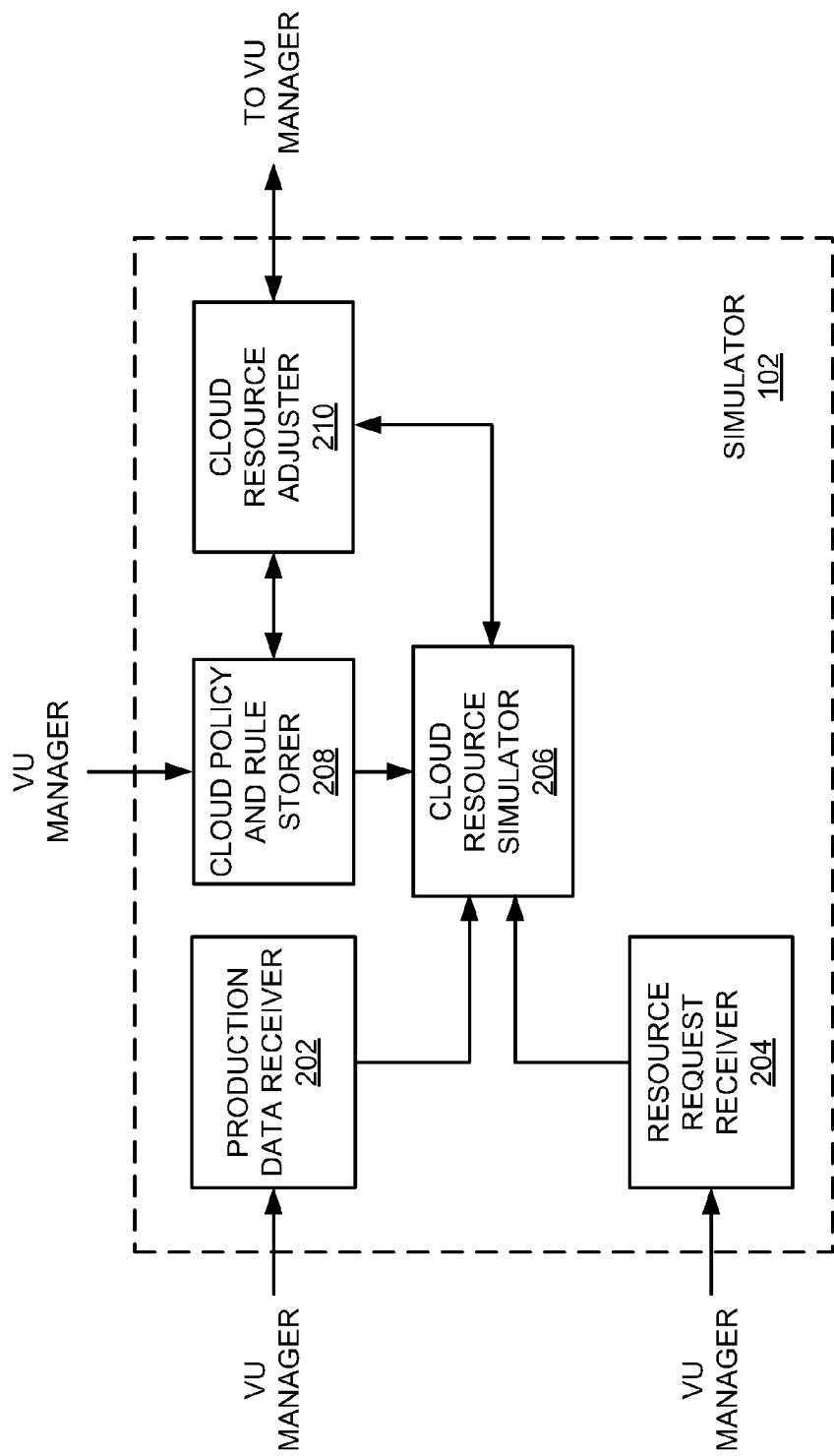
FIG. 2 is a schematic illustration of an example simulator that may be used to implement example distributive computing network of FIG. 1.

FIG. 2 illustrates an example manner of implementing the simulator 102 of the example distributive computing network 100 of FIG. 1. The example simulator 102 of FIG. 2 enables resource allocation in the distributive computing network 100 to be adjusted to optimize the performance and/or increase the efficiency of the distributive computing network 100. For example, if the user 104 requests a certain size and/or type of resources, the simulator 102 of the illustrated example may determine a more efficient way to provide the user with the service requested. For example, the simulator 102 may determine that using a different size and/or type of resource, and/or using resources in a different location, may be more efficient (e.g., in terms of lower cost, increased performance, increased speed, etc.). In such an example, the user 104 is provided with a level of service that meets a defined or otherwise specified level of service, but the distributive computing network 100 is able to optimize the manner with which it provides the service. To enable the adjusting of resource allocation in the distributive computing network 100, the simulator 102 of the illustrated example includes an example production data receiver 202, an example resource request receiver 204, an example cloud resource simulator 206, an example cloud policy and rule storer 208, and an example cloud resource adjuster 210.

The production data receiver 202 of the illustrated example receives production data from a VU manager (e.g., the VU manager 114). Production data reflects a current resource usage in the distributive computing network 100 (e.g. a current resource usage in the example production environment 128). Production data is statistical data related to the performance of one or more, or each, virtual unit(s) operating in the production environment 128 (e.g., in terms of CPU usage, memory usage, network traffic, response times, resource location, etc.) and that is passed to the VU manager 114. The production data receiver 202 of the illustrated example receives production data from the VU manager 114, for example, when the VU manager 114 receives a resource allocation request. In other examples, the production data receiver 202 may receive production data from the VU manager 114 continuously and store the production data in a database for use in simulations performed by the simulator 102.

The resource request receiver 204 of the illustrated example receives resource requests from the VU manager 114. A resource request indicates, defines and/or otherwise specifies a resource allocation to be implemented by the example distributive computing network 100. The resource request may be input, for example, by the user 104 via the portal 108 to create a new service and/or to modify an existing service being performed by the distributive computing network 100. A resource request might request, for example, a new and/or additional number of virtual machines for use by the user 104. A resource request may also be input, for example, by a manager of the distributive computing network 100 (e.g., the manager 134). The manager 134 may input a resource request to implement capacity planning for the distributive computing network 100. For example, the manager 134 may wish to investigate how the distributive computing network 100 would operate with an additional number of virtual machines being implemented (e.g., such as by determining whether performance levels would improve if additional virtual machines were implemented by the production environment 128). This capacity planning information is useful in determining whether to offer promotions to users, whether to lease resources to other cloud computing providers, whether to create additional resources, etc.

The cloud resource simulator 206 of the illustrated example executes a simulation to determine a manner in which to implement the resource allocation request received by the resource request receiver 204. The cloud resource simulator 206 enables the optimization of resource allocation such that resources are allocated efficiently (e.g., at the lowest cost, at the highest speeds, with the lowest number of virtual machines, etc.) while still providing the quality of service requested by the user 104.

To execute a simulation and determine a manner in which to implement a resource allocation request, the simulator 102 of the illustrated example uses the production data from the example production data receiver 202, the resource request from the resource request receiver 204, and policies and/or rules defined by and/or applied to the example distributive computing network 100, which are stored in the cloud policy and rule storer 208. Policies and/or rules may include, for example, an SLA agreed to by the user 104, quality of service parameters defined in a product catalog, business rules, cost rules, scheduling rules, etc. The VU manager 114 gathers and the cloud policy and rule storer 208 stores such policies and/or rules. Policies and/or rules assist the cloud resource simulator 206 in selecting a resource allocation that provides the user 104 with the requested, required, defined or otherwise specified level(s) of service. For example, the user 104 may request a service that is to be provided by 100 virtual machines (or some other number of virtual machines). The cloud resource simulator 206 of the illustrated example may execute a simulation and determine that the user's needs will be met with only 75 virtual machines. In another example, the cloud resource simulator 206 may determine that it is more efficient (e.g., less costly) to implement 50 virtual machines (or some other number of virtual machines) within the distributive computing network 100 and to lease another 50 virtual machines (or some other number of virtual machines) for the user 104 from another cloud computing provider. In such examples, the location of resources, type of resources, amount of resources, etc. may be varied while still providing the specified quality of service to the user 104.

Once the cloud resource simulator 206 of the illustrated example has executed a simulation, the cloud resource adjuster 210 adjusts the distributive computing network 100 according to the simulation. For example, if the cloud resource simulator 206 determines that 50 virtual machines should be created in the distributive computing network 100 and 50 virtual machines should be leased from another cloud computing provider, the cloud resource adjuster 210 implements this resource allocation by sending the appropriate information to the VU manager 114. The VU manager 114 may implement the resource allocation or may send the resource allocation to an orchestrator (e.g., the orchestrator 112) for approval and/or implementation. In another example, the cloud resource simulator 206 may run multiple simulations and provide multiple possible resource allocations to the cloud resource adjuster 210, which is to select one of the provided resource allocations for implementation. In another example, the VU manager 114 and/or the orchestrator 112 may be provided with multiple resource allocation options.

For ease of description, examples described herein refer to simulations of virtual machines. However, simulations may be performed for any type of virtual unit (e.g., a virtual unit that provides any of computing, storage, and/or network resources). For example, a simulation may be performed for a virtual unit providing VLAN connections in a network environment.

While an example manner of implementing the simulator 102 of FIG. 1 has been illustrated in FIG. 2, one or more of the elements, processes and/or devices illustrated in FIG. 2 may be combined, divided, re-arranged, omitted, eliminated and/or implemented in any other way. Further, the example production data receiver 202, the example resource request receiver 204, the cloud resource simulator 206, the cloud policy and rule storer 208, the cloud resource adjuster 210 and/or, more generally, the example simulator 102 of FIG. 2 may be implemented by hardware, software, firmware and/or any combination of hardware, software and/or firmware. Thus, for example, any of the example production data receiver 202, the example resource request receiver 204, the cloud resource simulator 206, the cloud policy and rule storer 208, the cloud resource adjuster 210 and/or, more generally, the example simulator 102 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example production data receiver 202, the example resource request receiver 204, the cloud resource simulator 206, the cloud policy and rule storer 208, the cloud resource adjuster 210 and/or, more generally, the example simulator 102 are hereby expressly defined to include a tangible computer readable medium such as a memory, DVD, CD, BluRay, etc. storing the software and/or firmware. Further still, the example simulator 102 of FIG. 2 may include one or more elements, processes and/or devices in addition to, or instead of, those illustrated in FIG. 2, and/or may include more than one of any or all of the illustrated elements, processes and devices.

Figure 3:
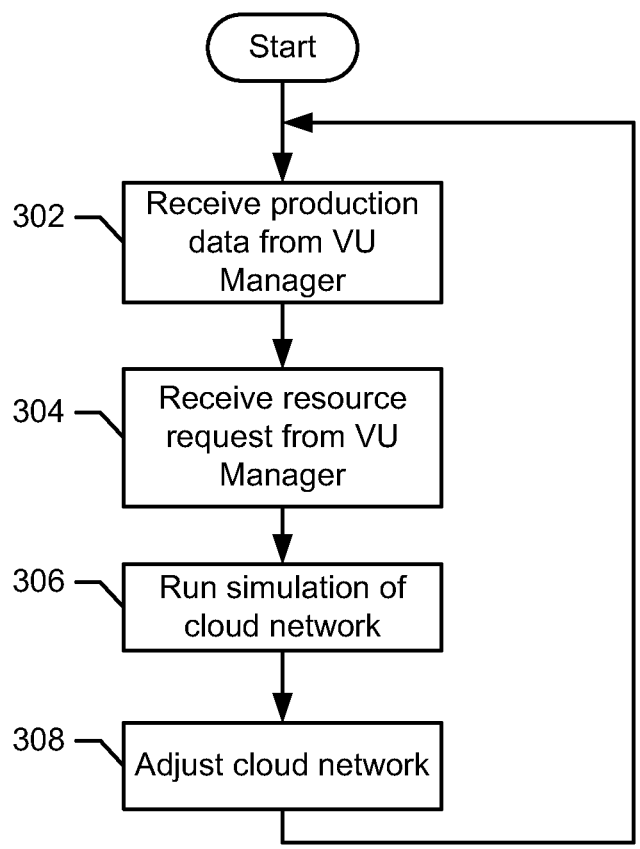
FIGS. 3-5 are flowcharts representative of example machine readable instructions that may be executed to implement the example simulator of FIG. 2.
Figure 4:
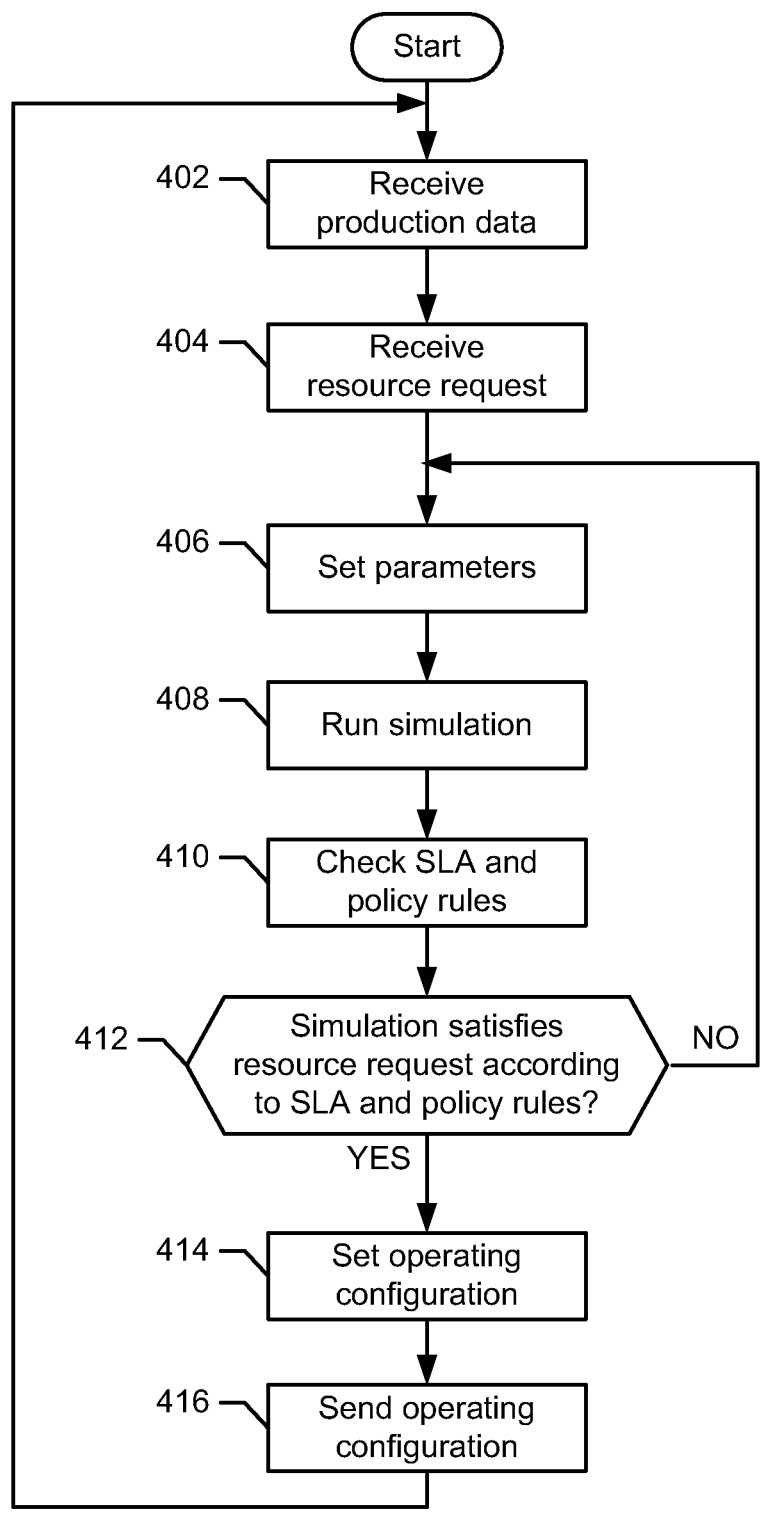
Figure 5:
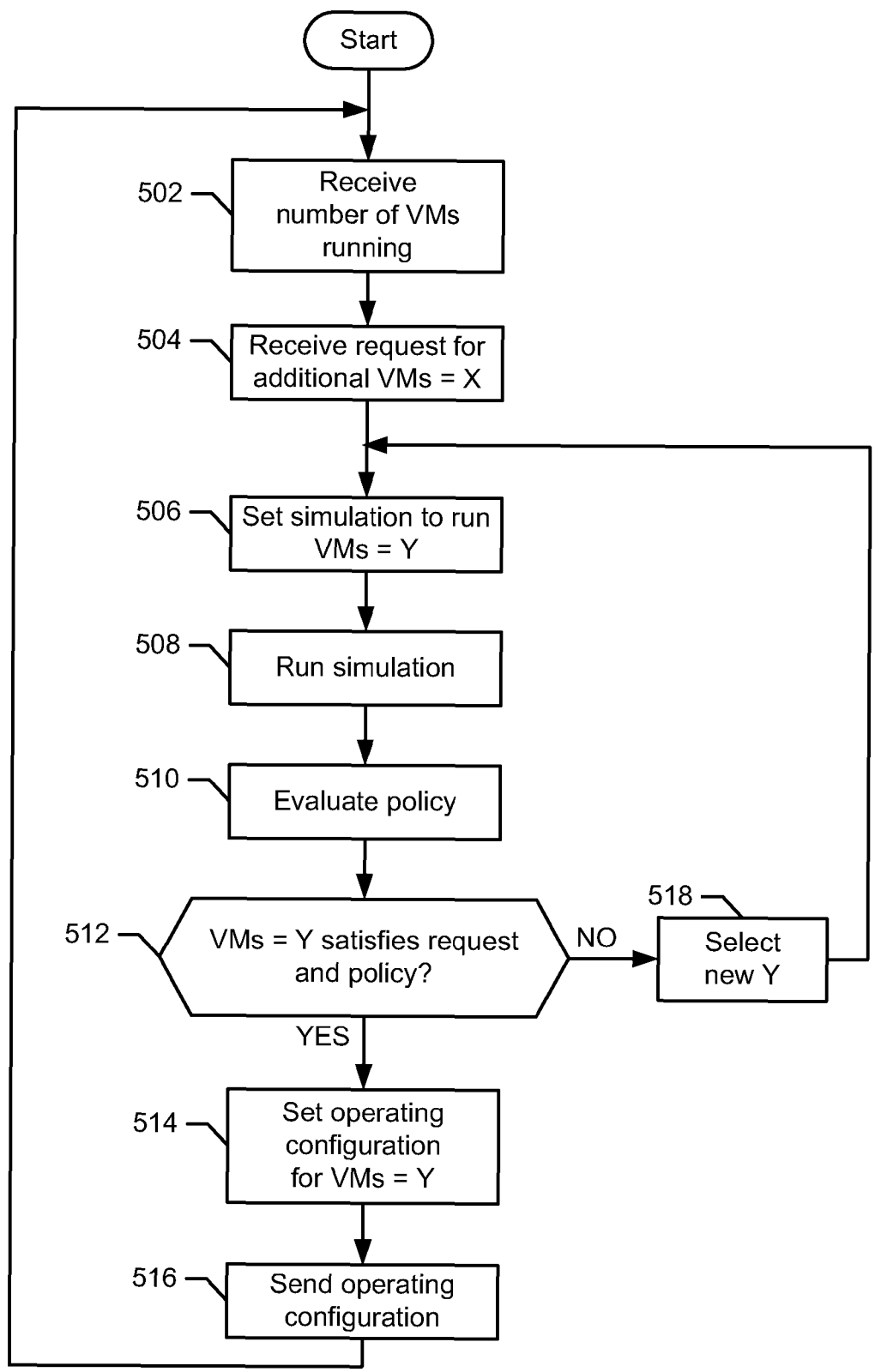

Flowcharts representative of example machine readable instructions for implementing the example production data receiver 202, the example resource request receiver 204, the example cloud resource simulator 206, the example cloud policy and rule storer 208, the example cloud resource adjuster 210, and/or the example simulator 102 of FIG. 2 are shown in FIGS. 3-5. In these examples, the machine readable instructions comprise a program for execution by a processor such as the processor 612 shown in the example computer 600 discussed below in connection with FIG. 6. The program may be embodied in software stored on a tangible computer readable medium such as a CD-ROM, a floppy disk, a hard drive, a digital versatile disk (DVD), a BluRay disk, or a memory associated with the processor 612, but the entire program and/or parts thereof could alternatively be executed by a device other than the processor 612 and/or embodied in firmware or dedicated hardware. Further, although the example program is described with reference to the flowcharts illustrated in FIGS. 3-5, many other methods of implementing the example production data receiver 202, the example resource request receiver 204, the example cloud resource simulator 206, the example cloud policy and rule storer 208, the example cloud resource adjuster 210, and/or the example simulator 102 may alternatively be used. For example, the order of execution of the blocks may be changed, and/or some of the blocks described may be changed, eliminated, or combined.

As mentioned above, the example processes of FIGS. 3-5 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 3-5 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

FIG. 3 is a flowchart representative of example machine readable instructions that may be executed to implement the example simulator 102 of FIGS. 1 and/or 2. As described above, the simulator 102 of the illustrated examples enables resource allocation in the distributive computing network 100 to be adjusted to improve (e.g., optimize) the performance and/or increase (e.g., optimize) the efficiency of the distributive computing network 100 while still providing the user 104 with expected and/or requested levels of service. For example, the simulator 102 may determine that the user 104 will be afforded a same or better quality of service relative to the quality of service specified by or otherwise associated with a resource allocation request, but that the resources allocated to the user may be implemented or otherwise provided in a different (e.g., more efficient) manner (e.g., via a different resource size, speed, location, type, etc.). The simulator 102 of the illustrated examples executes simulations during operation of the distributive computing network 100 to enable resources being allocated by the distributive computing network 100 to be adjusted as those resources are providing services to users (e.g., the user 104).

With the foregoing in mind and with reference to the preceding figures, upon execution of the example machine readable instructions of FIG. 3, the production data receiver 202 of the simulator 102 receives production data from the VU manager 114 (block 302). Production data is, for example, statistical data related to the performance and/or usage of one or more, or each, virtual unit(s) operating in the distributive computing network 100 (e.g., such as CPU usage data, memory usage data, network traffic data, etc.) that is collected by a VU agent assigned to the respective virtual unit and passed to the VU manager 114. The production data receiver 202 of the illustrated example may receive production data from the VU manager 114 periodically, aperiodically, continuously, and/or when the VU manager 114 receives a resource allocation request.

The resource request receiver 204 of the illustrated example receives a resource request from the VU manager 114 (block 304). A resource request (also referred to herein as a resource allocation request) defines a resource allocation to be implemented by the example distributive computing network 100. A resource request may be input by the user 104 to create a new service and/or to modify an existing service being performed by the distributive computing network 100. The simulator 102 may determine a possible or recommended manner of adjusting the resources provided by the distributive computing network 100 to modify an existing service. The simulator 102 may determine whether the distributive computing network 100 is capable of implementing a new service before creating and/or assigning resources in the distributive computing network 100 to provide that new service. A resource request may also be input by the manager 134 of the distributive computing network 100 to implement capacity planning. Capacity planning information gathered and/or determined by the simulator 102 is useful in determining whether to offer promotions to users, whether to lease resources to other cloud computing providers, whether to create additional resources, etc.

The cloud resource simulator 206 of the illustrated example runs and/or executes a simulation of the distributive computing network 100 (block 306). The simulation is executed to determine a possible or recommended manner in which to implement the resource allocation request received by the resource request receiver 204. In some examples, the cloud resource simulator 206 optimizes resource allocation (e.g., to allocate resources at the lowest cost, at the highest speeds, with the lowest number of virtual machines, etc.) while still providing at least the quality of service requested by the user 104 in the resource request and/or defined in an SLA.

At block 306, the simulator 102 of the illustrated example uses the production data from the example production data receiver 202, the resource request from the resource request receiver 204, and policies and/or rules defined by and/or applied to the example distributive computing network 100 and stored in the cloud policy and rule storer 208 to execute a simulation and determine a manner in which to implement a resource allocation request. Policies and/or rules may include, for example, an SLA agreed to by the user 104, quality of service parameters defined in a product catalog, business rules, cost rules, scheduling rules, etc. Policies and/or rules assist the cloud resource simulator 206 in selecting and/or varying the location of resources, type of resources, amount of resources, etc., while still providing quality service to the user 104.

After the cloud resource simulator 206 of the illustrated example has executed a simulation, the cloud resource adjuster 210 adjusts the distributive computing network 100 according to the simulation (block 308). For example, at block 308, the cloud resource adjuster 210 of the illustrated example adjusts the distributive computing network 100 by directing the VU manager 114 to implement the possible or recommended resource allocation determined by the cloud resource simulator 206 at block 306. The VU manager 114 may implement the resource allocation or may send the resource allocation to the orchestrator 112 for approval and/or implementation. In another example, the cloud resource simulator 206 may run multiple simulations at block 306 and provide multiple, possible resource allocations to the cloud resource adjuster 210, which at block 308 is to select one of the possible resource allocations by which to adjust the distributive computing network 100. In another example, the VU manager 114 and/or the orchestrator 112 may be provided with multiple resource allocation options by which to adjust the distributive computing network 100. After the distributive computing network 100 has been adjusted, control returns to block 302.

FIG. 4 is a flowchart representative of example machine readable instructions that may be executed to implement the example cloud resource simulator 206 of FIG. 2. As described above, the cloud resource simulator 206 of the illustrated example executes simulations to, for example, improve the performance and/or increase the efficiency of the distributive computing network 100.

With the foregoing in mind and with reference to the preceding figures, upon execution of the example machine readable instructions of FIG. 4, the cloud resource simulator 206 of the illustrated example receives production data from the example production data receiver 202 (block 402). The production data represents the performance of a resource allocation already being provided by the distributive computing network 100 (e.g., in terms of CPU usage, memory usage, network traffic, etc.). The resource allocation may include, for example, numbers of virtual machines, types of virtual machines, sizes of virtual machines, and/or locations of virtual machines being implemented by the distributive computing network 100. The cloud resource simulator 206 uses the production data to tailor its simulations to model the production environment 128.

The cloud resource simulator 206 of the illustrated example receives a resource request from the example resource request receiver 204 (block 404). The resource request specifies a resource allocation (e.g., a resource allocation different than the one being implemented by the distributive computing network 100) to be implemented by the example distributive computing network 100. The resource request may involve, for example, creating new services, modifying existing services, determining promotions to be offered, leasing services, removing services, etc.

The cloud resource simulator 206 of the illustrated example uses the production data and resource request to set parameters to be used in an execution of a simulation of the distributive computing network 100 (block 406). The cloud resource simulator 206 may use the production data to select a model to be used in the simulation. The model may be, for example, a set of certain predetermined resource allocation parameters for use in the simulation. The cloud resource simulator 206 may select a model with parameters closely resembling the received production data to be used in the simulation. In other examples, the cloud resource simulator 206 may select a model with parameters closely resembling the received production data and then alter those parameters based on the received production data and the resource request. In other examples, a new model may be created to simulate the received production data and resource request. In other examples, a mathematical expression may be selected to implement the simulation. In such examples, parameters will be selected to be input into the mathematical expression based on the received production data and resource request.

Once parameters have been set, the cloud resource simulator 206 of the illustrated example runs the simulation (block 408). In some examples, running the simulation may include evaluating the output of the aforementioned mathematical expression. For example, a simulation in the form of a mathematical expression may be used for simple resource allocation requests. For example, the distributive computing network may be capable of implementing 5,000 virtual machines (or some other number of virtual machines), but is currently operating only 2,000 virtual machines (or some other number of virtual machines). If a resource request is received to implement an additional 100 virtual machines (or some other number of additional virtual machines), a mathematical expression characterizing the resource request in terms of an operating capacity may be used by the cloud resource simulator to determine whether to implement the additional 100 virtual machines.

In another example, running the simulation at block 408 may include inputting the selected parameters into a simulated environment of the distributive computing network 100. A simulated environment is used to simulate the distributive computing network 100 and determine and/or compute an impact of the selected parameters on the overall performance of the distributive computing network 100. For example, a simulated environment may be used to determine a power supply needed to implement selected parameters, memory used when implementing the selected parameters, a cost associated with implementing the selected parameters, etc.

Once the selected parameters have been input into the simulated environment of the distributive computing network 100, the simulated environment is allowed to operate for a period of time. The period of time may be selected by example cloud resource simulator 206 based on the complexity of the simulation, the number of simulation parameters, etc. Once the simulated environment has been allowed to operate for the period of time, the cloud resource simulator 206 may gather and/or evaluate simulation data. The simulation data represents the performance of the simulated resource allocation implemented in the simulated environment and allows the cloud resource simulator 206 to assess the effectiveness of the parameters chosen and/or used in the simulation.

The cloud resource simulator 206 of the illustrated example gathers and/or determines rules and/or policies applicable to the distributive computing network 100 (block 410). Policies and/or rules may include, for example, an SLA agreed to by the user 104, quality of service parameters defined in a product catalog, business rules, cost rules, scheduling rules, etc. Policies and/or rules may be stored, for example, as and/or in data matrices to allow the cloud resource simulator 206 of the illustrated example to evaluate their effect on the results of the simulation and/or to determine whether the parameters used in the simulation should be implemented in the production environment 128 of the distributive computing network 100.

The cloud resource simulator 206 of the illustrated example determines whether the parameters used in the simulation (e.g., the parameters corresponding to the simulated resource allocation) satisfy the resource request and comply with the applicable rules and/or policies (block 412). Resource request information, policies, rules, etc. may be, for example, stored as and/or in data matrices. The cloud resource simulator 206 may utilize multiple data matrices related to, for example, performance prediction (e.g., based on historical performance data gathered by the VU manager 114), network traffic/latency (e.g., based on network traffic/latency data gathered by the VU manager 114), scheduling (e.g., based on scheduling data gathered by the VU manager 114), industry standards, etc. The cloud resource simulator 206 of the illustrated example compares results of the simulation (e.g., simulation data) to data stored in the data matrices to determine whether to implement the parameters used in the simulation.

If the parameters used in the simulation fail to satisfy the resource request and/or fail to comply with any rules and/or policies applicable to the distributive computing network 100, control returns to block 406 where the cloud resource simulator 206 of the illustrated example sets new parameters for a next simulation. The simulated resource allocation may fail to satisfy the resource request if, for example, the simulation data indicates that the level of service implemented by the simulated resource allocation would be less than or otherwise fail to achieve the level of service stated in the resource request. The simulated resource allocation may fail to comply with a rule and/or policy applicable to the distributive computing network 100 if, for example, the simulation data indicates that implementing the simulated resource allocation would require the price of the service to be set to a point higher than that agreed to by the user 104. The cloud resource simulator 206 of the illustrative example performs an iterative simulation process until reaching acceptable simulation results. For example, multiple parameters may be set in a simulation and the cloud resource simulator 206 may adjust (e.g., fine tune) each parameter in a plurality of simulations to achieve and/or determine a recommended result.

If the parameters used in the simulation satisfy the resource request and comply with the rules and/or policies applicable to the distributive computing network 100, the cloud resource simulator 206 determines an operating configuration to implement the simulated resource allocation used in the simulation. In some examples, the operating configuration is a set of instructions that defines a possible or recommended manner in which to implement the resource allocation request (e.g., such as in the form of a set of instructions to implement the simulation parameters determined to satisfy the resource request and comply with applicable policies and/or rules). For example, the instructions of the operating configuration may recommend adding 500 (or some other number of) virtual machines to the distributive computing network 100, using a first number (e.g., 50) of larger virtual machines instead of a larger second number (e.g., 1000) of smaller virtual machines in the distributive computing network 100, migrating new and/or existing virtual machines to another cloud computing provider outside of the distributive computing network 100, etc.

The cloud resource simulator 206 of the illustrated example sends the operating configuration to the cloud resource adjuster 210 to adjust the distributive computing network 100 according to the simulation, as described above (block 416). Control then returns to block 402.

FIG. 5 is a flowchart representative of second example machine readable instructions that may be executed to implement the example cloud resource simulator 206 of FIG. 2 to increase a resource allocation being implemented by the distributive computing network 100. In the example of FIG. 5, the cloud resource simulator 206 executes simulations to determine a manner in which to increase the resource allocation implemented by the distributive computing network 100.

With the foregoing in mind and with reference to the preceding figures, upon execution of the example machine readable instructions of FIG. 5, the cloud resource simulator 206 of the illustrated example receives production data from the example production data receiver 202 indicating a number (referred to as "X" in FIG. 5) of virtual machines (referred to as "VMs" in FIG. 5) currently being implemented by the distributive computing network 100 (block 502). The number of virtual machines currently operating in the distributive computing network 100 may be, for example, 2,000 (or some other number of virtual machines).

The cloud resource simulator 206 of the illustrated example receives a resource request from the example resource request receiver 204 requesting an amount (referred to as "Y" in FIG. 5) of additional virtual machines to be added to the client's service (block 504). The resource request may request, for example, 1,000 virtual machines (or some other number of virtual machines) be added to the 2,000 virtual machines currently being implemented by the distributive computing network 100.

The cloud resource simulator 206 of the illustrated example uses the production data indicating 2,000 virtual machines are currently being implemented and the resource request requesting an additional 1,000 virtual machines to set parameters to be used in an execution of a simulation of the distributive computing network 100 (block 506). For example, the cloud resource simulator 206 may set the simulation to run with 3,000 virtual machines.

The cloud resource simulator 206 of the illustrated example runs and/or executes a simulation with the parameter set in block 506 (block 508). For example, the cloud resource simulator 206 simulates the distributive computing network 100 implementing 3,000 virtual machines for a period of time. When the simulation is complete (e.g., the period of time set by the cloud resource simulator 206 has lapsed), the cloud resource simulator 206 of the illustrated example collects simulation data representing the performance of the 3,000 virtual machines in the simulated environment.

The cloud resource simulator 206 of the illustrated example evaluates policy and/or rules applicable to the distributive computing network 100 (block 510). For example, a policy of the distributive computing network 100 may state that the distributive computing network 100 will attempt to implement resources at a lowest possible cost. The policy and/or rules applicable to the distributive computing network 100 will be used by the cloud resource simulator 206 in determining if the simulation has reached an optimal result.

The cloud resource simulator 206 of the illustrated example determines if the simulation parameter used in the simulation satisfies the resource request and complies with policy and/or rules (block 512). For example, the cloud resource simulator 206 determines if implementing 3,000 virtual machines would satisfy the resource request. While implementing the 3,000 virtual machines satisfies the resource request of the illustrated example, this implementation may not provide the resources at the lowest possible cost as defined in the policy applicable to the distributive computing network 100 in the illustrated example.

If implementing the 3,000 virtual machines satisfies the resource request and complies with policy and/or rules applicable to the distributive computing network 100 (e.g., these resources are provided at the lowest possible cost), the cloud resource simulator 206 of the illustrated example will set an operating configuration to implement the resources used in the simulation (block 514). For example, the cloud resource simulator 206 will set the operating configuration to adjust the distributive computing network 100 to implement 1,000 additional virtual machines. The cloud resource simulator 206 of the illustrated example sends the operating configuration to the cloud resource adjuster 210 to implement the operating configuration. Control then returns to block 502.

If implementing the 3,000 virtual machines does not satisfy the resource request and/or does not comply with policy and/or rules applicable to the distributive computing network 100 (e.g., these resources are not provided at the lowest possible cost), the cloud simulator 206 of the illustrated example selects new parameters for a next simulation (block 518) and control returns to block 506. The next simulation may, for example, have parameters set to simulate the implementation of 500 virtual machines (or some other number of virtual machines) in the distributive computing network 100 and the leasing of 500 virtual machines (or some other number of virtual machines) from another cloud computing provider. The simulation data from this second simulation may indicate that the cost of implementing the resource allocation according to these parameters (e.g., 500 virtual machines in the distributive computing network 100 and 500 virtual machines from another cloud computing provider) would have a lower cost than implementing all additional 1,000 virtual machines in the distributive computing network 100 itself. Thus, the cloud simulator 206 may set and send an operating configuration indicating that the distributive computing network should implement 500 additional virtual machines and lease 500 virtual machines from another cloud computing provider. The leasing of virtual machines from other cloud computing providers is facilitated by, for example, the orchestrator 112. Control then returns to block 502.

Figure 6:
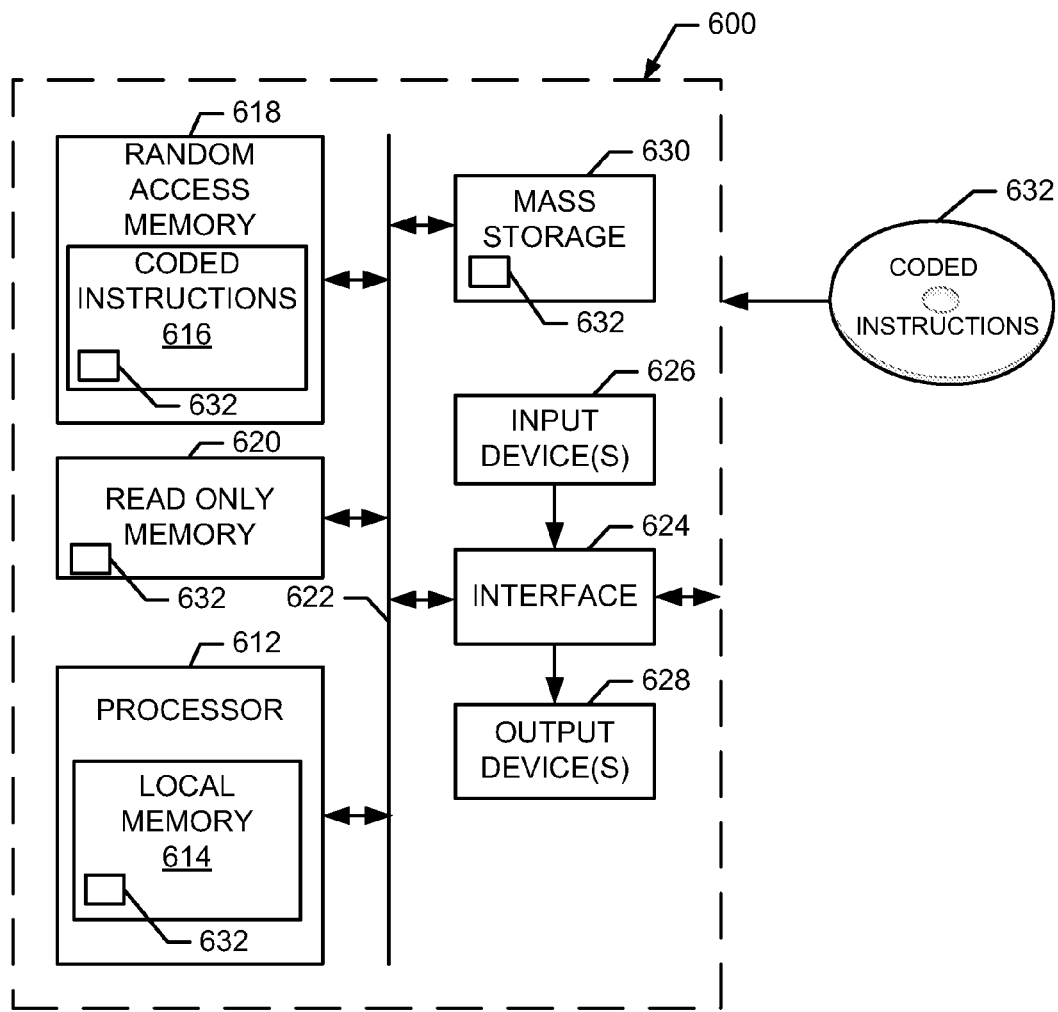
FIG. 6 is a schematic illustration of an example processor platform to execute the example instructions of FIGS. 3-4 and/or 5 to implement the example simulator of FIG. 2 and/or the example distributive computing network of FIG. 1.

FIG. 6 is a block diagram of an example processing platform 600 capable of executing the instructions of FIGS. 3-5 to implement the example production data receiver 202, the example resource request receiver 204, the example cloud resource simulator 206, the example cloud policy and rule storer 208, the example cloud resource adjuster 210, and/or the example simulator 102 of FIG. 2 and/or the distributive computing network 100 of FIG. 1. The processing platform 600 can be, for example, a server, a personal computer, an Internet appliance, or any other type of computing device.

The platform 600 of the instant example includes a processor 612 such as a general purpose programmable processor. For example, the processor 612 can be implemented by one or more microprocessors or controllers from any desired family or manufacturer. The processor 612 includes a local memory 614, and executes coded instructions 616 which may be present in the local memory 614 and/or in another memory device (e.g., a volatile memory 618). The processor 612 may execute, among other things, the machine readable instructions represented in FIGS. 3-5.

The processor 612 is in communication with a main memory including the volatile memory 618 and a non-volatile memory 620 via a bus 622. The volatile memory 618 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 620 may be implemented by flash memory and/or any other desired type of memory device. Access to the main memory 618, 620 is typically controlled by a memory controller.

The processing platform 600 also includes an interface circuit 624. The interface circuit 624 may be implemented by any type of interface standard, such as an Ethernet interface, a universal serial bus (USB), a peripheral component interconnect (PCI), and/or a third generation input/output (3GIO) interface.

One or more input devices 626 are connected to the interface circuit 624. The input device(s) 626 permit a user to enter data and commands into the processor 612. The input device(s) can be implemented by, for example, a keyboard, a mouse, a touchscreen, a track-pad, a trackball, and/or an isopoint.

One or more output devices 628 are also connected to the interface circuit 624. The output devices 628 can be implemented, for example, by display devices (e.g., a liquid crystal display, a cathode ray tube display (CRT)). The interface circuit 624, thus, typically includes a graphics driver card.

The interface circuit 624 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The processing platform 600 also includes one or more mass storage devices 630 for storing machine readable instructions and data. Examples of such mass storage devices 630 include floppy disk drives, hard drive disks, compact disk drives, digital versatile disk (DVD) drives, flash drives, etc.

Coded instructions 632 corresponding to FIGS. 3-5 may be stored in the mass storage device 630, in the volatile memory 618, in the non-volatile memory 620, in the local memory 614 and/or on a removable storage medium, such as a CD or DVD 632.

As an alternative to implementing the methods and/or apparatus described herein in a system such as the processing platform of FIG. 6, the methods and or apparatus described herein may be embedded in a structure such as a processor and/or an ASIC (application specific integrated circuit).

From the foregoing, it will appreciate that the above disclosed methods, systems, apparatus, and/or articles of manufacture provide for the adjusting of distributive computing network resources to optimize the performance of the distributive computing network while maintaining levels of service expected by users.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method to adjust resource allocation in a distributive computing network, the method comprising:
    receiving, at a computing device comprising a processor, production data representing performance of a first resource allocation provided by the distributive computing network;
    receiving, at the computing device, a resource request specifying a second resource allocation to be provided by the distributive computing network, the second resource allocation different than the first resource allocation;
    in response to the resource request, selecting, by the computing device, parameters resembling the production data;
    altering, by the computing device, the parameters based on the resource request;
    inputting, by the computing device, the parameters, as altered based on the resource request, into a simulated environment of the distributive computing network;
    operating, by the computing device, the simulated environment of the distributive computing network for a period of time;
    determining, by the computing device, an operating configuration based on simulation data from the operation of the simulated environment of the distributive computing network for the period of time, the operating configuration specifying a third resource allocation, the third resource allocation different than the second resource allocation; and adjusting, by the computing device, the first resource allocation provided by the distributive computing network to the third resource allocation based on the operating configuration to fulfill the resource request, wherein operating the simulated environment is performed while the distributive computing network is providing the first resource allocation to enable the first resource allocation to be adjusted while the first resource allocation is being provided by the distributive computing network.

2. The method of claim 1, wherein the first resource allocation includes at least one of a number, type, size, or location of virtual units implemented by the distributive computing network.

3. The method of claim 1, further comprising determining if the simulation data satisfy the resource request and a policy governing a behavior of the distributive computing network.

4. The method of claim 1, wherein the operating configuration is a set of instructions to implement the third resource allocation in the distributive computing network.

5. The method of claim 1, further comprising providing the operating configuration specifying a third resource allocation as one of a plurality of options for fulfilling the resource request.

6. A system to adjust resource allocation in a distributive computing network, the system comprising:
a processor; and
a memory storing instructions that, when executed by the processor, cause the processor to perform operations comprising
receiving production data representing performance of a first resource allocation provided by the distributive computing network,
receiving a resource request specifying a second resource allocation to be provided by the distributive computing network, the second resource allocation different than the first resource allocation,
in response to the resource request, selecting parameters resembling the production data,
altering the parameters based on the resource request,
inputting the parameters, as altered based on the resource request, into a simulated environment of the distributive computing network,
operating the simulated environment of the distributive computing network for a period of time,
determining an operating configuration based on simulation data from the operation of the simulated environment of the distributive computing network for the period of time, the operating configuration specifying a third resource allocation, the third resource allocation different than the second resource allocation, and
adjusting the first resource allocation provided by the distributive computing network to the third resource allocation based on the operating configuration to fulfill the resource request, wherein operating the simulated environment is performed while the distributive computing network is providing the first resource allocation to enable the first resource allocation to be adjusted while the first resource allocation is being provided by the distributive computing network.

7. The system of claim 6, wherein the first resource allocation includes at least one of a number, type, size, or location of virtual units implemented by the distributive computing network.

8. The system of claim 6, wherein the operations further comprise determining if the simulation data satisfy the resource request and a policy governing a behavior of the distributive computing network.

9. The system of claim 6, wherein the operating configuration is a set of instructions to implement the third resource allocation in the distributive computing network.

10. A non-transitory computer-readable medium comprising instructions that, when executed by a computing device comprising a processor, cause the computing device to perform operations comprising:
receiving production data representing performance of a first resource allocation provided by a distributive computing network;
receiving a resource request specifying a second resource allocation to be provided by the distributive computing network, the second resource allocation different than the first resource allocation;
in response to the resource request, selecting parameters resembling the production data;
altering the parameters based on the resource request;
inputting the parameters, as altered based on the resource request, into a simulated environment of the distributive computing network;
operating the simulated environment of the distributive computing network for a period of time;
determining an operating configuration based on simulation data from the operation of the simulated environment of the distributive computing network for the period of time, the operating configuration specifying a third resource allocation, the third resource allocation different than the second resource allocation; and
adjusting the first resource allocation provided by the distributive computing network to the third resource allocation based on the operating configuration to fulfill the resource request, wherein operating the simulated environment is performed while the distributive computing network is providing the first resource allocation to enable the first resource allocation to be adjusted while the first resource allocation is being provided by the distributive computing network.

11. The non-transitory computer-readable medium of claim 10, wherein the first resource allocation includes at least one of a number, type, size, or location of virtual units implemented by the distributive computing network.

12. The non-transitory computer-readable medium of claim 10, wherein the operations further comprise determining if the simulation data satisfy the resource request and a policy governing a behavior of the distributive computing network.

13. The non-transitory computer-readable medium of claim 10, wherein the operating configuration is a set of instructions to implement the simulation parameters in the distributive computing network.

14. The non-transitory computer-readable medium of claim 10, wherein the operations further comprise offering a promotion to a user based on the simulation data, the promotion being an offer to sell a service provided by the distributive computing network.

* * * * *